United States Patent
Vitiello et al.

(10) Patent No.: US 8,844,505 B2
(45) Date of Patent: Sep. 30, 2014

(54) METHOD FOR MANAGING THE EXHAUST GAS CIRCULATION CIRCUIT OF A PETROL THERMAL ENGINE AND CORRESPONDING RECIRCULATION SYSTEM

(75) Inventors: Nicolas Vitiello, Paris (FR); Sebastien Potteau, Triel sur Seine (FR); Frederic Cousin, Clichy (FR); Loic Violette, Courbevoie (FR); Damien Fournigault, Conflans-Sainte-Honorine (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 867 days.

(21) Appl. No.: 13/054,799

(22) PCT Filed: Jul. 17, 2009

(86) PCT No.: PCT/FR2009/000879
§ 371 (c)(1),
(2), (4) Date: Jan. 19, 2011

(87) PCT Pub. No.: WO2010/010246
PCT Pub. Date: Jan. 28, 2010

(65) Prior Publication Data
US 2011/0180048 A1    Jul. 28, 2011

(30) Foreign Application Priority Data
Jul. 22, 2008 (FR) ...................................... 08 04171

(51) Int. Cl.
*F02M 25/07*    (2006.01)
*F02D 41/00*    (2006.01)
*F02B 29/04*    (2006.01)

(52) U.S. Cl.
CPC ...... *F02D 41/005* (2013.01); *F02D 2041/0017* (2013.01); *Y02T 10/47* (2013.01); *F02M 25/0718* (2013.01); *F02M 25/0709* (2013.01); *F02M 25/0728* (2013.01); *F02B 29/0406* (2013.01)
USPC ....................................... 123/568.2; 60/605.2

(58) Field of Classification Search
USPC ........................... 123/568.2, 568.21, 568.11, 123/568.16–568.19; 701/108; 60/605.2
See application file for complete search history.

(56) References Cited

U.S. PATENT DOCUMENTS 4,130,093 A * 12/1978 Aoyama ....................... 123/676
(Continued)

FOREIGN PATENT DOCUMENTS

| DE | 10 2006 054043 A1 | 5/2008 | |
|----|----|----|----|
| JP | 2001-280202 A | 10/2001 | |
| JP | 2009243448 A | * 10/2009 | ........... F02D 45/00 |

OTHER PUBLICATIONS
International Search Report w/translation from PCT/FR2009/000879 dated Jan. 13, 2010 (6 pages).

*Primary Examiner* — Hieu T Vo
(74) *Attorney, Agent, or Firm* — Osha Liang LLP

(57) ABSTRACT

The invention relates to a method for managing an exhaust gas recirculation circuit of a petrol thermal engine, the engine including at least one combustion chamber connected to an inlet line and an exhaust line between which extends said recirculation circuit, the recirculation circuit including a flow-rate adjustment valve, wherein said method comprises the step of adjusting flow-rate adjustment valve based on a flow-rate setpoint, said method further comprising the steps of: detecting an operation parameter representative of a pressure difference between an upstream pressure and a downstream pressure relative to the flow-rate adjustment valve, and, after comparing the parameter with a threshold corresponding to a minimum pressure difference, adjusting the flow-rate in at least one of the lines in order to increase the pressure difference.

10 Claims, 4 Drawing Sheets

(56) References Cited

U.S. PATENT DOCUMENTS

| | | | | |
|---|---|---|---|---|
| 4,149,501 A | * | 4/1979 | Gropp | 123/568.29 |
| 4,282,487 A | * | 8/1981 | Warren et al. | 324/445 |
| 4,306,534 A | * | 12/1981 | Wessel et al. | 123/568.18 |
| 4,671,246 A | * | 6/1987 | Maisch | 123/568.25 |
| 6,805,095 B2 | * | 10/2004 | Sun et al. | 123/399 |
| 7,275,525 B2 | * | 10/2007 | Miyasako et al. | 123/568.16 |
| 7,367,188 B2 | * | 5/2008 | Barbe et al. | 701/108 |
| 7,380,400 B2 | * | 6/2008 | Barbe et al. | 123/568.2 |
| 2004/0084015 A1 | | 5/2004 | Sun et al. | |
| 2007/0079614 A1 | | 4/2007 | Barbe et al. | |

* cited by examiner

METHOD FOR MANAGING THE EXHAUST GAS CIRCULATION CIRCUIT OF A PETROL THERMAL ENGINE AND CORRESPONDING RECIRCULATION SYSTEM

The present invention relates to a method for managing an exhaust gas recirculation circuit of an internal combustion gasoline (or petrol) engine and to a system for circulating the gases of such an engine.

BACKGROUND OF THE INVENTION

A combustion engine comprises an engine block delimiting combustion chambers which are connected to a fresh gas inlet line and to a burnt gas exhaust line. Mounted in the inlet line is a flow regulating butterfly valve the position of which is determined by the extent to which the throttle pedal of the vehicle is depressed in order to control the rotational speed of the engine. A turbine for driving a compressor mounted in the inlet line is generally mounted in the exhaust line.

It is known practice in internal combustion diesel engines to fit between the inlet line and the exhaust line an exhaust gas recirculation circuit that recirculates exhaust gases to the inlet line. Such a recirculation circuit generally comprises a valve that regulates the flow passing through the recirculation circuit. The recirculation circuit is generally connected to the exhaust line upstream of the turbine and to the inlet line downstream of the compressor (this is the recirculation circuit type known as a high-pressure circuit).

The plan is, in the future, to equip internal combustion gasoline engines with a recirculation circuit which would be connected to the exhaust line downstream of the turbine and, more specifically, downstream of the catalytic converter, and to the inlet line upstream of the compressor (the recirculation circuit would then be of the low-pressure type) in order to reduce the exhaust temperature and increase the resistance to pinging of these engines. That however assumes that the flow rate of gases through the recirculation circuit can be regulated precisely and reliably over the entire engine operating range in order to limit the pollutant emissions of this engine, stabilize combustion and prevent the onset of pinging. Regulation is generally performed using a measurement of the difference in pressure between the pressure upstream and the pressure downstream of the recirculation circuit flow regulating valve. However, at light load, this pressure difference is small and dictates the use of pressure sensors of an accuracy that makes them expensive.

Object of the Invention

The invention intends to provide a means that will enable flow regulation within an exhaust gas recirculation circuit for an internal combustion gasoline engine to be made more reliable but in a simple and inexpensive way.

SUMMARY OF THE INVENTION

To this end, the invention provides a method for managing an exhaust gas recirculation circuit of an internal combustion gasoline engine, the engine comprising at least one combustion chamber connected to an inlet line and an exhaust line between which lines the recirculation circuit extends, the recirculation circuit comprising a flow regulating valve and the method comprising the step of operating the flow regulating valve as a function of a flow rate setpoint, the method comprising the steps of:

detecting an operating parameter representative of a difference in pressure between a pressure upstream and a pressure downstream of the flow regulating valve,
having compared the parameter against a threshold corresponding to a minimum pressure difference, regulating the flow rate in at least one of the lines in order to increase the pressure difference.

In other words, when the comparison between the parameter and the threshold indicates that the pressure difference across the flow regulating valve is below a minimum value, the pressure in at least one of the lines is regulated in order to increase this pressure difference.

The representative operating parameter may for example be the engine speed.

The minimum pressure difference is determined in order to meet a need for flow rate through the valve (determined for engine operation) but more especially to ensure that a sufficiently accurate estimate of flow rate can be obtained, because pressure and/or flow rate sensors commonly used in the automotive industry have a satisfactory precision for high flow rates but are not sensitive enough for low flow rates and their accuracy is therefore reduced.

Thus, the flow rate in one of the lines is regulated in such a way as to increase the pressure difference across the flow regulating valve of the recirculation circuit significantly enough to make it easier to operate the recirculation circuit flow regulating valve, particularly to allow flow rate to be measured more accurately.

According to some alternative embodiments:
the increase in the pressure difference is obtained by regulating the flow rate in a zone of the inlet line situated upstream of the recirculation circuit in such a way as to reduce the pressure in the inlet line downstream of this zone and of the recirculation circuit;
the increase in pressure difference is obtained by regulating the flow in the exhaust line downstream of the recirculation circuit so as to increase the pressure at the exhaust line end of the recirculation circuit.

For preference then, the inlet line comprises, downstream of the recirculation circuit, a butterfly valve for regulating engine speed, and the method comprises the step of acting on the butterfly valve in order to compensate for the variation in pressure in the inlet line or in the exhaust line.

The butterfly valve used for regulating engine speed therefore performs an additional function of compensating for the variation in pressure produced in the inlet line or in the exhaust line for the purposes of increasing the pressure difference.

Advantageously, the regulation for increasing the pressure difference is performed by means of at least one additional valve mounted in the relevant line, the method comprising the steps of:

determining a minimum pressure difference that is sufficient to meet a requirement for flow rate and/or to allow the flow rate in the recirculation circuit flow regulating valve to be determined,
determining a position setpoint for the additional valve on the basis of at least the minimum pressure difference,
correcting the position of the additional valve as a function of a measurement representative of the pressure difference in the recirculation circuit.

This embodiment makes it possible to obtain relatively short response times for the control loop and makes it possible to satisfy the flow rate requirement and/or determine the flow rate in the regulating valve accurately.

According to one preferred feature, the minimum pressure difference is used to deduce a pressure upstream and a pressure downstream of the additional valve, which pressures are used to determine a flow rate through the additional valve using a Barré Saint Venant model.

Another subject of the invention is a system for circulating the gases of an internal combustion gasoline engine, comprising an inlet line and an exhaust line to which lines an exhaust gas recirculation circuit is connected, a butterfly valve for regulating engine speed being mounted in the inlet line downstream of the recirculation circuit, a first flow regulating valve being mounted in the recirculation circuit and a second flow regulating valve being mounted in one of the lines, the butterfly valve and the second valve being connected to a control unit designed to operate the second valve in such a way as to increase a difference in pressure between a pressure upstream and a pressure downstream of the first valve and the butterfly valve in order to compensate for this variation in pressure.

Thus the pressure difference across the valve is increased and the butterfly valve is operated in such a way as to compensate for the variation in pressure (that occurs as a result of this increase) at the engine so as not to disrupt the operation of this engine or negatively affect its performance.

The second valve may be arranged in the inlet line upstream of the recirculation circuit. It may also be arranged in the exhaust line upstream of the recirculation circuit.

Other features and advantages of the invention will emerge from reading the following description of two particular non-limiting embodiments of the invention.

BRIEF DESCRIPTION OF THE DRAWINGS

Reference will be made to the accompanying drawings, among which.

DETAILED DESCRIPTION OF THE INVENTION

Figure 1:
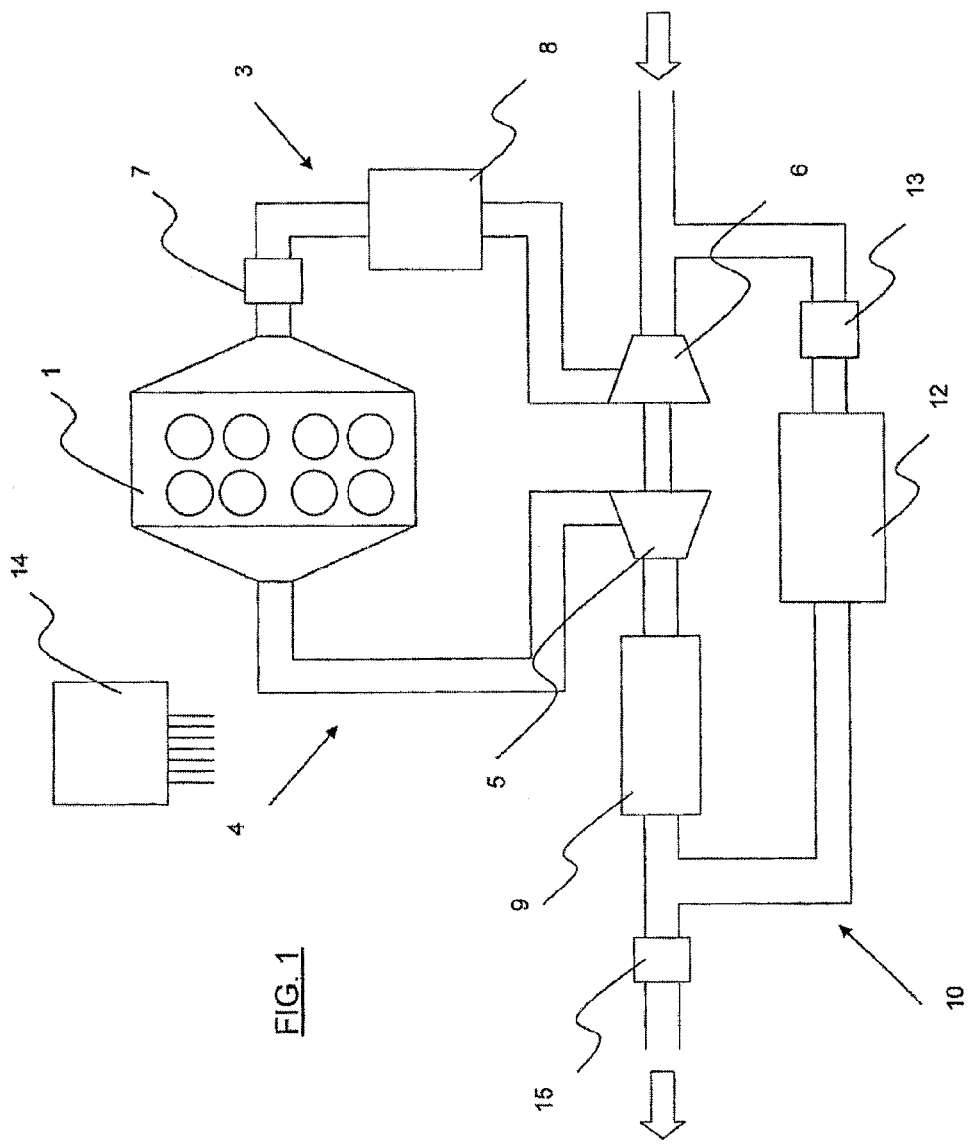
FIG. 1 is a schematic depiction of an engine comprising a gas circulation system according to a first embodiment of the invention.
Figure 4:
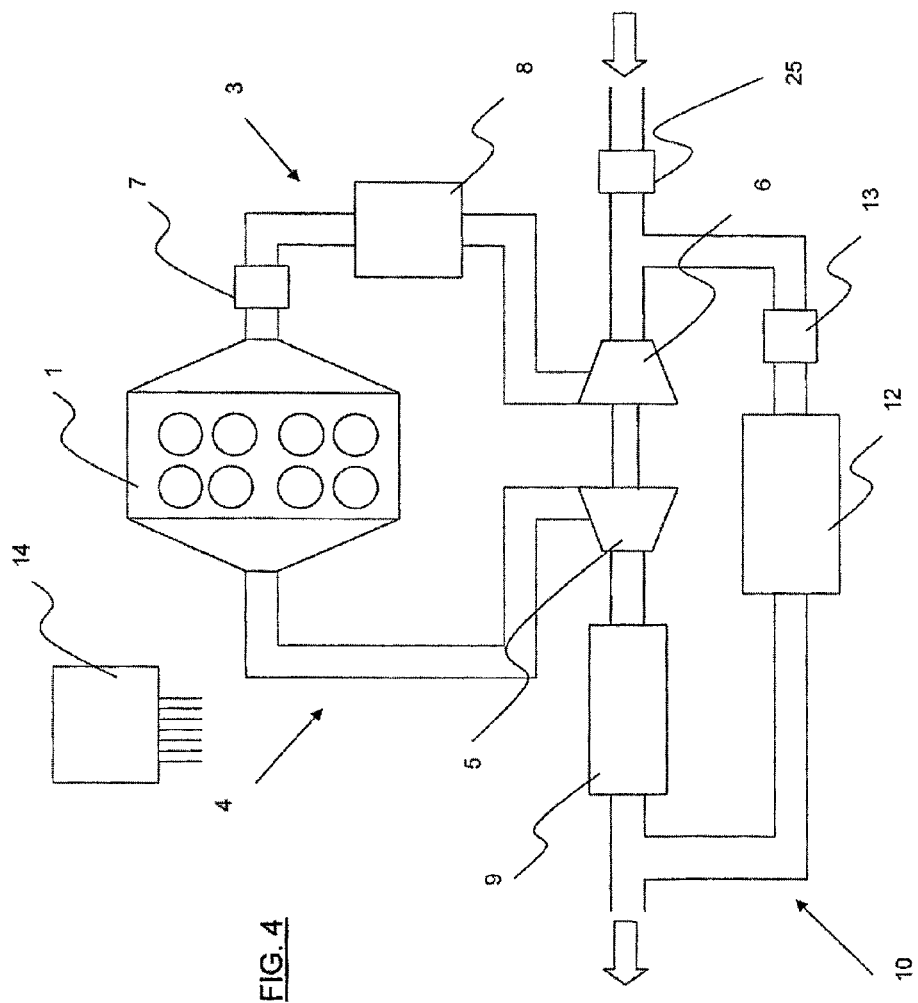
FIG. 4 is a schematic view of an engine having a gas circulation system according to a second embodiment of the invention.

With reference to FIGS. 1 and 4, the engine comprises an engine block 1 delimiting combustion chambers 2 connected to an inlet line 3 and to an exhaust line 4. Mounted in the exhaust line 4 is a turbine 5 that drives a compressor 6 itself mounted in the inlet line 3.

Mounted in the inlet line, between the engine block 1 and the compressor 6, are a butterfly valve 7 for regulating engine speed and a charge air cooler 8.

Mounted in the exhaust line downstream of the turbine 5 is a catalytic converter 9.

An exhaust gas recirculation (or EGR) circuit 10 is mounted between the exhaust line 4 and the inlet line 3. The EGR circuit 10 has one end connected to the exhaust line 4 downstream of the catalytic converter 9 and one end connected to the inlet line 3 upstream of the compressor 6. The EGR circuit comprises a cooler 12 which, in a way known per se, comprises a cooled path and a non-cooled path between which a bypass member is mounted so as to direct the flow of exhaust gas selectively to the cooled path or to the uncooled path. The EGR circuit 10 also comprises a flow regulating valve 13, in this instance mounted between the cooler 12 and the inlet line 3.

An engine control unit 14 or ECU is connected to the butterfly valve 7, to the regulating valve 13, to the ignition circuit (not depicted), and to the fuel injection circuit (not depicted), in order to operate these as a function of information supplied by sensors that sense engine operating characteristics and as a function of the instructions issued by the driver, for example via the throttle pedal, the gear ratio selected, the driving mode chosen, etc.

Figure 2:
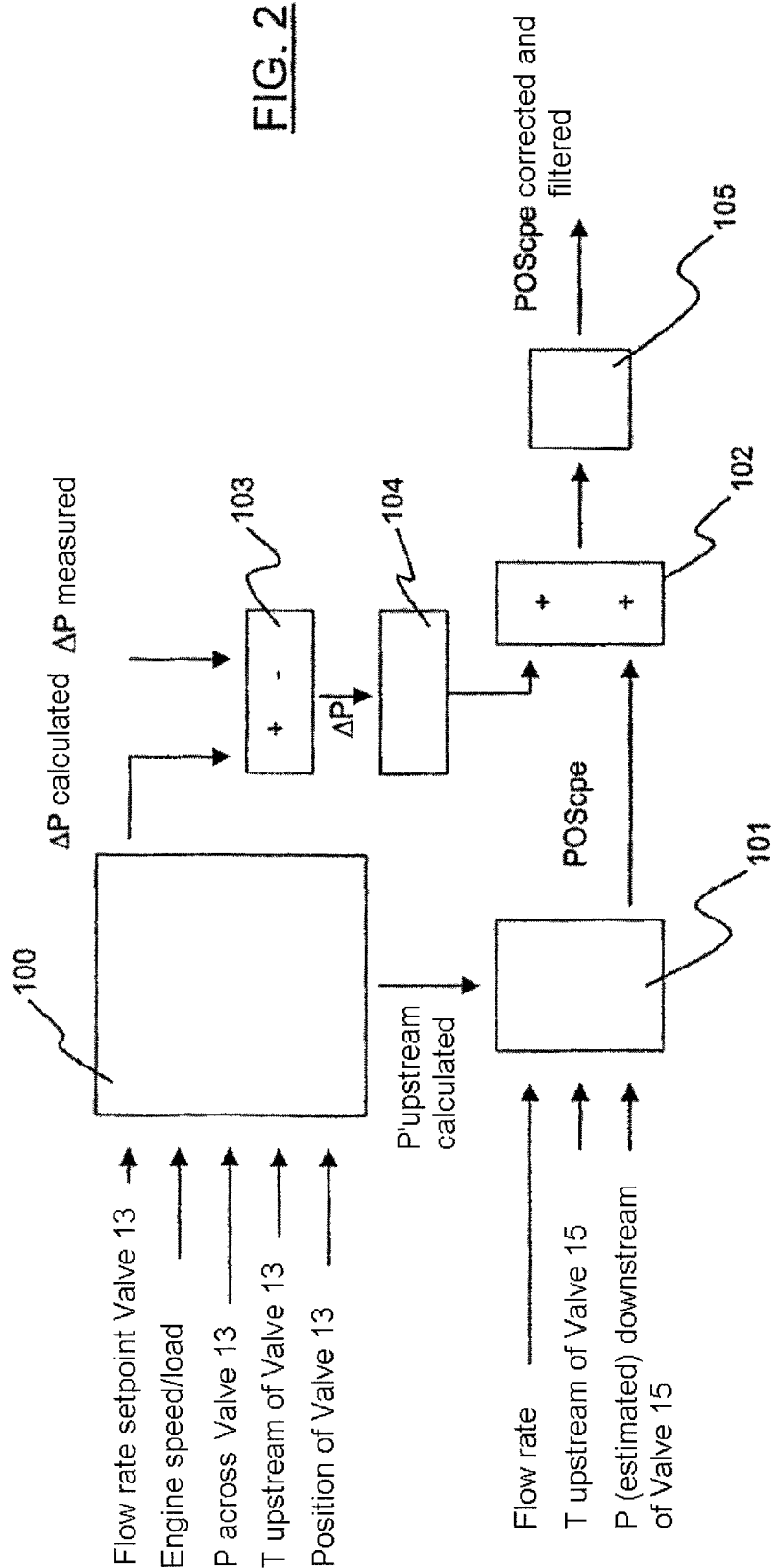
FIG. 2 is a block diagram illustrating the implementation of the method according to the invention in this gas circulation system.

With reference more specifically to FIGS. 1 and 2, the exhaust line 4 comprises an additional valve known as a backpressure valve 15, which is mounted downstream of the connection between the exhaust line 4 and the EGR circuit 10. This backpressure valve 15 is connected to the engine control unit 14 so that it can be operated thereby.

The method according to the invention will now be described with reference also to FIG. 2.

On the basis of measures or estimates and of temperature upstream of the flow regulating valve 13, of the pressure across the flow regulating valve 13, of the position (that is to say the degree of opening) of the flow regulating valve 13 and of the flow rate set-point for the flow regulating valve 13 (which will have been determined beforehand as a function of the requirements to introduce burnt gases into the inlet line), the engine control unit 14 determines, in this instance by calculation (step 100), a pressure $P_{upstream}$ upstream of the regulating valve 13 and a calculated difference in pressure $\Delta P$ between the pressure upstream and the pressure downstream of the regulating valve 13 that is sufficient to allow the actual flow rate through the flow regulating valve 13 to be determined. From this, the pressure $P'_{upstream}$ upstream of the back-pressure valve 15 is deduced. The pressure $P'_{upstream}$ is equal to the pressure $P_{upstream}$. The position of the backpressure valve 15 is then calculated (step 101) from the corresponding flow rate, from the temperature upstream of the backpressure valve 15 and from the pressure downstream of the backpressure valve 15. This position, denoted $POS_{cpe}$, is then corrected (step 102) using a corrective value. The corrective value comes from a correction of the PID (Proportional, Integral, Derivative) type performed (step 103) on the calculated pressure difference $\Delta P$ and the measurement of the pressure difference across the regulating valve 13 ($\Delta P$ measured). The PID-type correction allows the position to be realigned, providing a remedy to any shift that could occur as a result of fouling, wear, etc. The position thus corrected is filtered (step 104) then used as a setpoint to operate the backpressure valve 15. It will be appreciated that the position $POS_{cpe}$ of the backpressure valve 15 is first of all calculated in open loop (step 101) and then calculated in closed loop (step 102).

In the following description of the second embodiment, those elements which are identical or analogous to those already described bear the same numerical references.

The engine shown in conjunction with the second embodiment is identical to the one described with reference to the first embodiment, except that:

there is no backpressure valve in the exhaust line or, at least, such a valve is not used for the purpose of increasing the difference in pressure between the pressure upstream and the pressure downstream of the regulating valve 13, the inlet line 3 comprises an additional valve 25 mounted upstream of the connection between the EGR circuit 10 and the inlet line 3. The additional valve 25 is, as before, operated by the engine control unit 14 in such a way as to reduce the pressure between the additional valve 25 and the butterfly valve 7 in order to increase the difference in pressure between the pressure upstream and the pressure downstream of the regulating valve 13. The control method used to operate the additional valve 25 is identical to that used for the backpressure valve 15, except that the parameters that determine the position of the additional valve 25 and of the regulating valve 13 are the pressure upstream of the additional valve 25 and the pressure downstream of the regulating valve 13.

Figure 3:
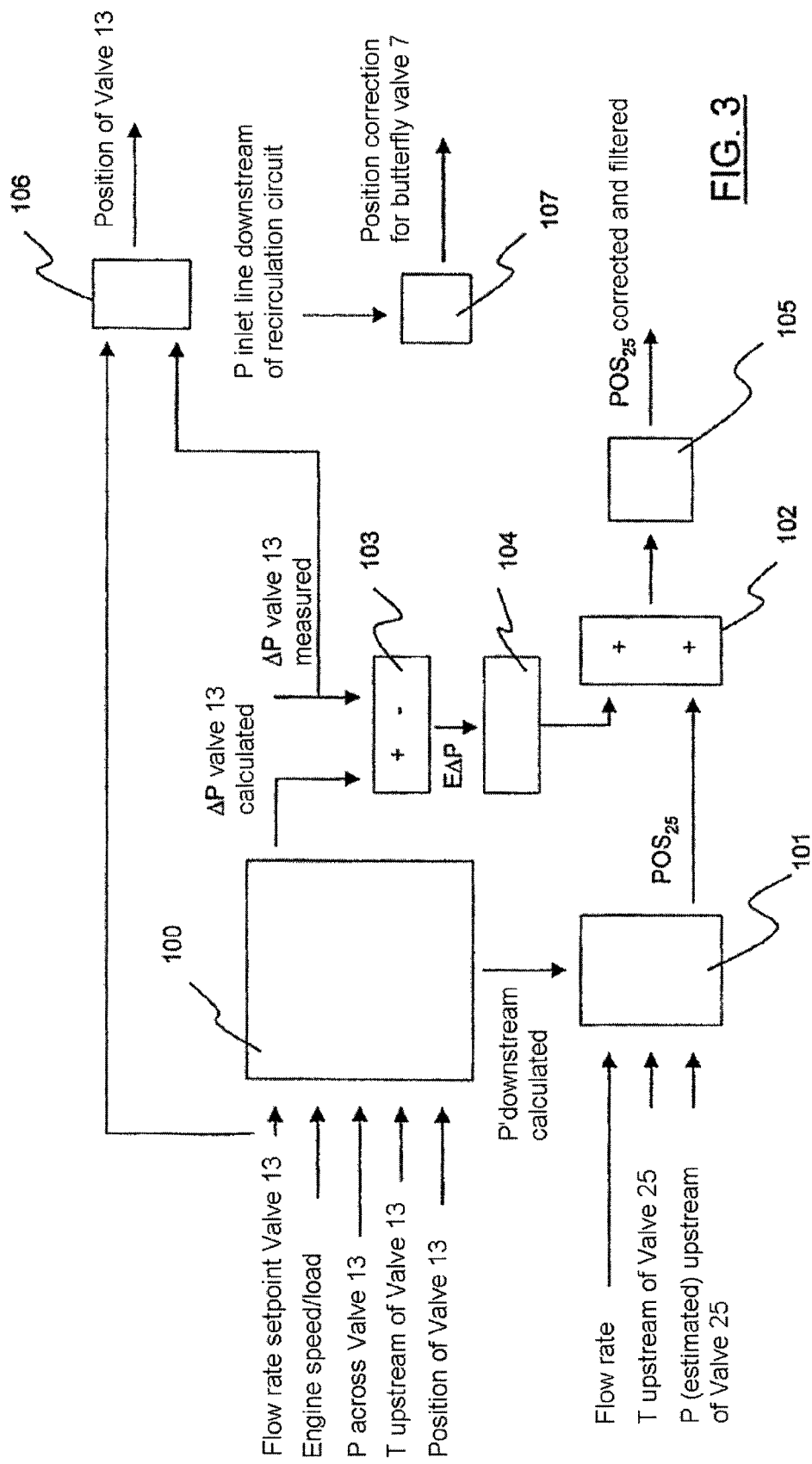
FIG. 3 is a diagram similar to that of FIG. 2 but of an alternative implementation.

In the method of FIG. 3, action also on the butterfly valve 7 is planned.

In this alternative form, the plan is to determine an operating parameter representative of a difference in pressure between a pressure upstream and a pressure downstream of the flow regulating valve 13. Having compared the parameter against a threshold corresponding to a minimum pressure difference, the method comprises the step of acting on the additional valve 25 in order to increase the pressure difference. More specifically, the instruction applied to the additional valve 25 aims to reduce the pressure downstream of the regulating valve 13. There is also a plan to act on the control of the butterfly valve 7 in order to increase the pressure in the inlet line, that is to say downstream of the regulating valve 13 so as to, at the engine, compensate for the variation in pressure caused by the control instructions.

In this alternative form, steps 100 to 105 are identical to those already described.

The position $POS_{25}$ of the additional valve 25 is determined on the basis of the flow rate (setpoint), of the temperature T upstream of the valve 25, of an estimate of the pressure upstream of the valve 25 and of a pressure $P'_{downstream}$ downstream of the valve 25 which is calculated during the course of step 100 and equal to the pressure downstream of the valve 13 that is needed in order to have the pressure difference $\Delta P$ (setpoint) across the valve 13.

The flow rate setpoint for the valve 13 and the pressure difference $\Delta P$ measured across the valve 13 are then also used to model the stream of air (step 106) in the engine in order to determine the position setpoint for the valve 13.

The position of the butterfly valve 7 is corrected as a function of a measurement of the pressure in the inlet line between the butterfly valve 7 and the recirculation circuit (i.e. downstream of the recirculation circuit).

It will be noted that the parameter adopted for determining the position of the valves is always representative of a difference in pressure between the pressure upstream and the pressure downstream of the regulating valve 13.

Of course, the invention is not restricted to the embodiment described and embodiment variants can be applied to it without departing from the scope of the invention as defined by the claims.

The methods of FIGS. 2 and 3 can be used in both embodiments of the system.

The invention claimed is:

1. A system for circulating the gases of an internal combustion gasoline engine, comprising:
   an inlet line and an exhaust line to which lines an exhaust gas recirculation circuit is connected;
   a butterfly valve for regulating engine speed mounted in the inlet line downstream of the recirculation circuit; and
   a first flow regulating valve mounted in the recirculation circuit and a second flow regulating valve mounted in one of the lines, the butterfly valve and the second valve being connected to a control unit designed to operate the second valve to increase a difference in pressure between a pressure upstream and a pressure downstream of the first valve and the butterfly valve in order, at the engine, to compensate for this variation in pressure.

2. The system as claimed in claim 1, in which the second valve is arranged in the inlet line upstream of the recirculation circuit.

3. The system as claimed in claim 1, in which the second valve is arranged in the exhaust line upstream of the recirculation circuit.

4. A method for managing an exhaust gas recirculation circuit of an internal combustion gasoline engine, the engine comprising at least one combustion chamber connected to an inlet line and an exhaust line between which lines the recirculation circuit extends, the recirculation circuit comprising a flow regulating valve, the method comprising:
   operating the flow regulating valve as a function of a flow rate setpoint;
   detecting an operating parameter representative of a difference in pressure between a pressure upstream and a pressure downstream of the flow regulating valve; and
   having compared the parameter against a threshold corresponding to a minimum pressure difference, regulating the flow rate in at least one of the lines in order to increase the pressure difference.

5. The method as claimed in claim 4, in which the increase in the pressure difference is obtained by regulating the flow rate in zones of the inlet line which are situated upstream and downstream of the recirculation circuit in such a way as to reduce the pressure in the inlet line between these two zones.

6. The method as claimed in claim 4, in which the increase in pressure difference is obtained by regulating the flow rate in the inlet line downstream of the recirculation circuit and in the exhaust line downstream of the recirculation circuit in such a way as to increase the pressure at the exhaust line end of the recirculation circuit and reduce the pressure at the inlet line end of the recirculation circuit.

7. The method as claimed in claim 6, in which the inlet line comprises, downstream of the recirculation circuit, a butterfly valve for regulating engine speed, and wherein the method further comprises acting on the butterfly valve in order, at the engine, to compensate for the variation in pressure in the inlet line or in the exhaust line.

8. The method as claimed in claim 4, in which the regulation for increasing the pressure difference is performed by at least one additional valve mounted in the relevant line, the method further comprising:
   determining a minimum pressure difference that is sufficient to allow the flow rate in the recirculation circuit flow regulating valve to be determined;
   determining a position setpoint for the additional valve on the basis of at least the minimum pressure difference; and
   correcting the position of the additional valve as a function of a measurement representative of the pressure difference in the recirculation circuit.

9. The method as claimed in claim 8, in which the minimum pressure difference is used to deduce a pressure upstream and a pressure downstream of the additional valve, which pressures are used to determine a flow rate through the additional valve using a Barre Saint Venant model.

10. The method as claimed in claim 9, in which the operating parameter representative of a difference in pressure between the pressure upstream and the pressure downstream of the flow regulating valve is the engine speed.

* * * * *